(12) United States Patent
Zhang et al.

(10) Patent No.: US 10,248,778 B2
(45) Date of Patent: *Apr. 2, 2019

(54) METHOD FOR IMPROVING UNLOCKING SPEED AND MOBILE TERMINAL

(71) Applicant: Guangdong Oppo Mobile Telecommunications Corp., Ltd., Dongguan, Guangdong (CN)

(72) Inventors: Haiping Zhang, Guangdong (CN); Yibao Zhou, Guangdong (CN)

(73) Assignee: Guangdong Oppo Mobile Telecommunications Corp., Ltd., Dongguan (CN)

(*) Notice: Subject to any disclaimer, the term of this patent is extended or adjusted under 35 U.S.C. 154(b) by 0 days.

This patent is subject to a terminal disclaimer.

(21) Appl. No.: 15/988,890

(22) Filed: May 24, 2018

(65) Prior Publication Data

US 2018/0268122 A1 Sep. 20, 2018

Related U.S. Application Data

(63) Continuation of application No. 15/824,522, filed on Nov. 28, 2017, which is a continuation of application No. PCT/CN2016/091546, filed on Jul. 25, 2016.

(30) Foreign Application Priority Data

Mar. 14, 2016 (CN) .......................... 2016 1 0147471

(51) Int. Cl.
*G06F 21/32* (2013.01)
*G06K 9/00* (2006.01)
*G09G 3/20* (2006.01)

(52) U.S. Cl.
CPC .......... *G06F 21/32* (2013.01); *G06K 9/0002* (2013.01); *G09G 3/2003* (2013.01); *G09G 2320/0666* (2013.01); *G09G 2360/144* (2013.01)

(58) Field of Classification Search
CPC ...................................................... G06F 21/32
(Continued)

(56) References Cited

U.S. PATENT DOCUMENTS

2009/0040170 A1* 2/2009 Nilsson .................... H04N 5/58
345/101
2015/0047017 A1 2/2015 Kim et al.
(Continued)

FOREIGN PATENT DOCUMENTS

CN 104503683 A 4/2015
CN 104516636 A 4/2015
(Continued)

OTHER PUBLICATIONS

Androidcentral.com: "Is there a way to turn off ambient light sensor on galaxy tab s10.5", Nov. 27, 2014 (Nov. 27, 2014).
(Continued)

*Primary Examiner* — Lynn D Feild
*Assistant Examiner* — Dereena T Cattungal
(74) *Attorney, Agent, or Firm* — Young Basile Hanlon & MacFarlane, P.C.

(57) ABSTRACT

A method for improving unlocking speed and a mobile terminal are provided. The method is applicable to the mobile terminal in a screen-off state and equipped with a metal dome array. The method includes the follows. A first thread is executed when a current unlock mode of the mobile terminal is press-to-trigger fingerprint unlock in the screen-off state, and a second thread is executed during the execution of the first thread. The first thread includes the following. An operation instruction is received when a user touches a fingerprint module, a fingerprint image is acquired, the
(Continued)

fingerprint image acquired is compared with a preset fingerprint image, and unlock after a successful match. The second thread includes the following. An operation instruction is received when the user presses the metal dome array, and wait for unlocking success and then a display screen is lit up.

4 Claims, 8 Drawing Sheets

(58) Field of Classification Search
USPC .......................................................... 726/19
See application file for complete search history.

(56) References Cited

U.S. PATENT DOCUMENTS

| | | | | |
|---|---|---|---|---|
| 2015/0146944 | A1* | 5/2015 | Pi | H04L 63/0861 |
| | | | | 382/124 |
| 2016/0239701 | A1* | 8/2016 | Lee | G06F 21/32 |
| 2017/0047048 | A1* | 2/2017 | Rumreich | G09G 5/10 |

FOREIGN PATENT DOCUMENTS

| | | |
|---|---|---|
| CN | 104796552 A | 7/2015 |
| CN | 104899029 A | 9/2015 |
| CN | 105303090 A | 2/2016 |

OTHER PUBLICATIONS

Cory Gunther: "How to disable ambient display on the nexus 6", Nov. 18, 2014 (Nov. 18, 2014).

\* cited by examiner

METHOD FOR IMPROVING UNLOCKING SPEED AND MOBILE TERMINAL

CROSS-REFERENCE TO RELATED APPLICATION

This application is a continuation of U.S. Ser. No. 15/824,522, filed on Nov. 28, 2017, which is a continuation of International Application No. PCT/CN2016/091546, filed on Jul. 25, 2016, which claims priority to Chinese Patent Application No. 201610147471.4, filed on Mar. 14, 2016, the contents of all of which are herein incorporated by reference in their entireties.

TECHNICAL HELD

The present disclosure relates to the field of mobile terminal technology, and particularly to a method for improving unlocking speed and a mobile terminal.

BACKGROUND

As mobile terminals advanced rapidly, mobile terminals such as mobile phones, tablet PCs or the like can provide increasing convenience to users in life, work, entertainment, and other aspects. Competition among various mobile terminal manufacturers is very intense. Optimization of product details often becomes manufacturer's focus of competition and promotion. For example, unlocking speed has become an aspect of competition of major manufacturers.

Biological password, because of its unique and advanced nature, has gradually become a standard configuration of mainstream terminals, such as fingerprint identification technology, iris recognition technology and the like. The biological password can be widely used in unlocking, waking up, mobile payment and other functions, and fully meet user requirements of convenience and security. When unlocking a mobile terminal in a screen-off state (screen-off unlock) using the biological password, the time required for a system to respond and light up a screen account for a large portion of unlocking time. Especially when lighting up the screen, most mobile terminals are equipped with light sensors and color temperature sensors, and light sensing and color temperature detection are turned on, this will lead to a longer time to light up the screen and a longer unlocking time in a screen-off state, and user experience is severely affected.

BRIEF DESCRIPTION OF THE DRAWINGS

The present disclosure will now be described, by way of example only, with reference to the accompanying drawings. It will be apparent that the drawings described in the following represent merely exemplary of the disclosure, and those of ordinary skill in the art will be able to obtain other drawings from these drawings without creative work.

DETAILED DESCRIPTION

Figure 1:
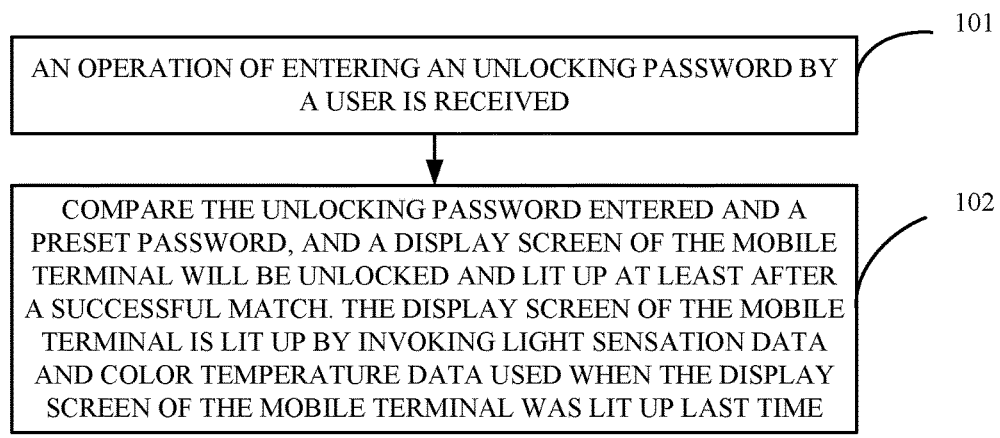
FIG. 1 is a schematic flowchart illustrating a method for improving unlocking speed in accordance with a first implementation of the disclosure.

Hereinafter, technical solutions embodied in implementations of the disclosure will be described in a clear and comprehensive manner in conjunction with the accompanying drawings. It is evident that the implementations described herein constitute merely some rather than all of the implementations of the disclosure. Those of ordinary skill in the art will be able to derive other implementations based on these implementations without making inventive efforts, which all such derived implementations shall all fall in the protection scope of the disclosure.

"Mobile terminal" in the implementations of the disclosure may include smart phones, tablet PCs, palmtops, laptops, mobile Internet devices (MID), or wearable devices. The above-mentioned terminals are merely illustrative and not exhaustive, including but not limited to the above-described mobile terminals.

The terms "first", "second", and "third" appearing in the present specification, claims and drawings are intended for distinguishing different objects rather than describing a particular order. In addition, the terms "include", "comprise" "have" and any variations thereof are intended to cover anon-exclusive inclusion. Such as a process, method, system, product, or apparatus that includes a series of steps or units, is not limited to the listed steps or units, but optionally may also include steps or units not listed, or alternatively other steps or units inherent to these processes, methods, products, or apparatuses.

The phrase "and/or" used herein refers to and encompasses any or all of the possible combinations of one or more associated listed items. For example, for the purpose of the present disclosure, the phrases "A and/or B" and "A or B" mean (A), (B), or (A and B).

The term "module" may be used to refer to one or more physical or logical components or elements of a system. In some implementations, a module may be a distinct circuit, while in other implementations a module may include a plurality of circuits.

The phrase "unlocking password" may be a biological password. The biological password may include but is not limited to a fingerprint password, an iris password, a face image password, a brain wave password, a heartbeat password, or a voice password. The password can be in the form of images, such as fingerprint images and the like.

In the related art, when unlocking a mobile terminal, unlocking and lighting up (also known as waking up) of a terminal screen are conducted sequentially. Besides, light sensing and color temperature detection are turned on, so as to ensure that real-time data can be collected in the current environment to set the brightness and color temperature used when lighting up the screen after the screen-off unlock is successful.

In implementations of the present disclosure, in the screen-off state, unlocking and lighting up of a screen are performed in parallel so as to shorten the unlocking time of the terminal. In at least one implementation, the screen is unlocked and lighted up at least after a successful match.

In order to further improve the unlocking speed, light sensation adjustment and color temperature detection function will be turned off or remained in a turn-off state. Light sensation data and color temperature data used the last time the display screen of the mobile terminal was lit up will be invoked to light up the display screen of the mobile terminal. Thereby eliminating the need of tedious and time-consuming detection of brightness and color temperature of current real-time environment and as a result, the display screen can be lit up immediately and the unlocking speed can be further improved. The user does not have to wait for an excessively long unlocking time, thereby improving practicability of the terminal and providing better user experience for the user.

First Implementation

FIG. 1 is a schematic flowchart illustrating a method for improving unlocking speed in accordance with a first implementation of the disclosure. The method is applicable to a mobile terminal in a screen-off state and may include the following.

At block 101, an operation of entering an unlocking password by a user is received.

The following describes the fingerprint password as an example. The user may touch a fingerprint module of the mobile terminal with a finger when entering the unlocking password. The capacitance of a capacitor for generating an Interrupt Request (IRQ) in the fingerprint module may be changed at the moment of finger-touch. The mobile terminal may treat the moment as a start time of unlocking.

At block 102, compare the unlocking password entered and a preset password, and a display screen of the mobile terminal will be unlocked and lit up at least after the unlocking password entered and the preset password is matched. The display screen of the mobile terminal is lit up by invoking light sensation data and color temperature data used the last time the display screen of the mobile terminal was lit up. Obviously, the terminal cannot be unlocked if the comparison fails. It is possible to remind the user that he or she has failed to unlock the terminal or without any processing, and the implementations of the disclosure are not limited.

The unlocking password entered can be the biological password of the user for example. In response to the entering of the biological password, the biological password will be obtained and compared with a preset biological password. For example, a fingerprint image, an iris image, a face image, a brain wave image, an electrocardiographic image, or a sound waveform image received will be compared with a preset fingerprint image, a preset iris image, a preset face image, a preset brain wave image, a preset electrocardiographic image, or a preset sound waveform image correspondingly. For example, the mobile terminal may receive an operation of entering a fingerprint image when the user touches a fingerprint module, then acquire the fingerprint image entered by the user and compare it with the preset fingerprint image.

After obtaining the biological password, to better compare the preset password, an original image corresponding to the obtained biological password can be optimized to make the original image clearer.

As one implementation, in the method for improving the unlocking speed, a moment that the display screen is lit up is considered as an end time of the unlocking.

To obtain better display effects, light sensing (also known as light sensation adjustment) and color temperature detection will usually be turned on simultaneously. The method in accordance with the implementations of the disclosure is still applicable to scenes where only one of light sensing and color temperature detection is turned on. In this situation, what need to do is, determining whether one of light sensing and color temperature detection is turned on and if so, turning it off and then lighting up the display screen by invoking data used the last time the display screen was lit up. "The last time" used herein may refer to that, with respect to the current screen-off state, when the display screen was lit up in the previous time. In addition to the data used the last time the display screen was lit up, data used for lighting up set by manufactures or the user may also be invoked to light up the display screen, and the implementations of the disclosure are not limited thereto.

In the screen-off state, by receiving the operation of entering the unlocking password by the user, the unlocking password entered by the user can be obtained. Then compare the unlocking password with the preset password. If the unlocking password and the preset password are matched, the mobile terminal will be unlocked and the display screen of the mobile terminal will be lit up. As one implementation, the display screen can be lit up by invoking the light sensation data and the color temperature data used when the display screen of the mobile terminal was lit up last time. Thereby eliminating the need for tedious and time-consuming detection of brightness and color temperature of current real-time environment and consequently, the display screen can be lit up immediately and the unlocking speed can be improved. The user does not have to wait for an excessively long unlocking time, thereby improving practicability of the terminal and providing better user experience for the user.

Second Implementation

Figure 2:
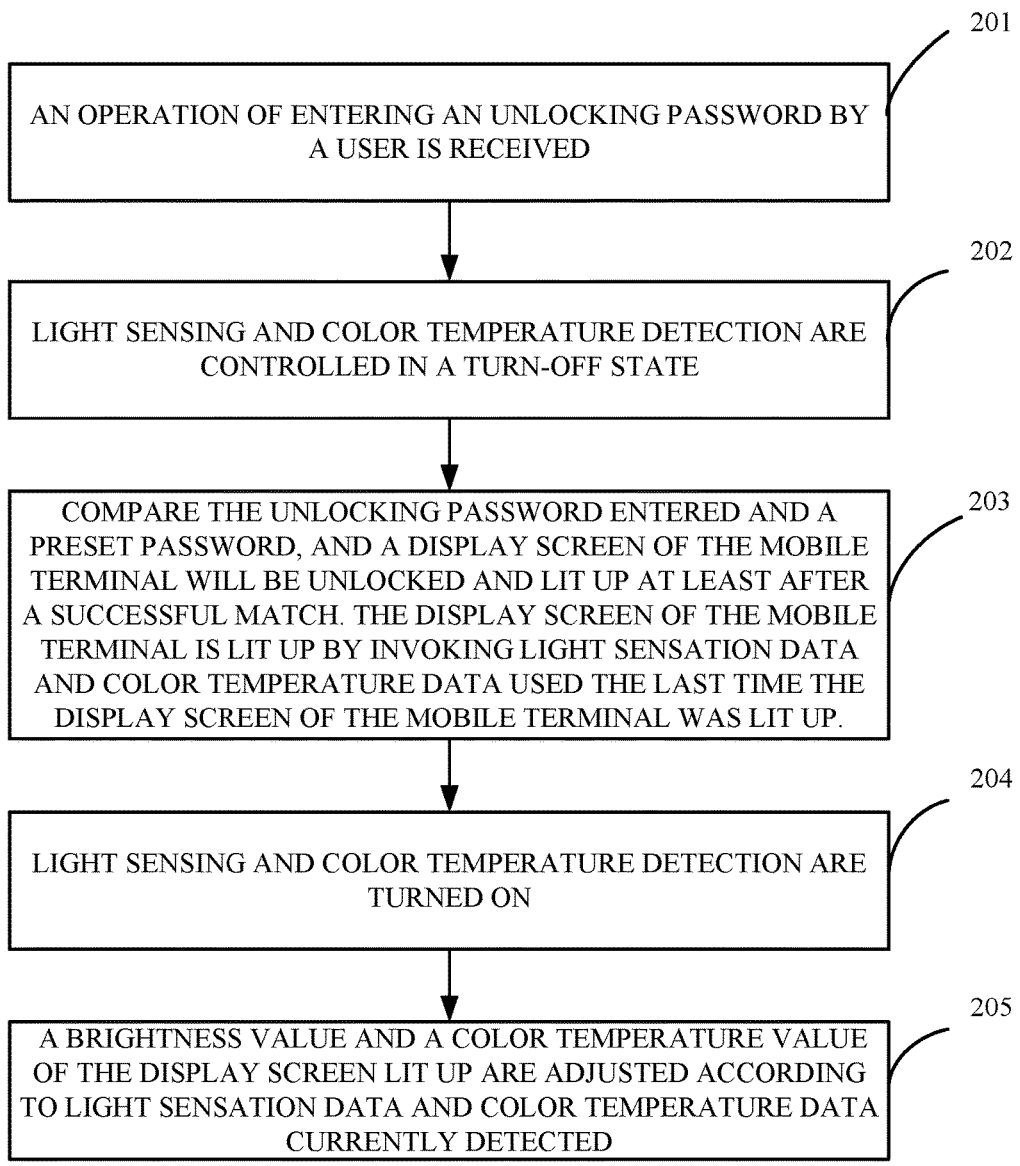
FIG. 2 is a schematic flowchart illustrating a method for improving unlocking speed in accordance with a second implementation of the disclosure.

FIG. 2 is a schematic flowchart illustrating a method for improving unlocking speed in accordance with a second implementation of the disclosure. The method is applicable to a mobile terminal in a screen-off state and may include the following.

At block 201, an operation of entering an unlocking password by a user is received.

The following describes the fingerprint password as an example. The user may touch a fingerprint module of the mobile terminal with a finger in order to enter the unlocking password. The capacitance of a capacitor for generating an Interrupt Request (IRQ) in the fingerprint module may be changed at the moment of finger-touch. The mobile terminal may treat the moment as a start time of unlocking.

At block 202, light sensing and color temperature detection are controlled in a turn-off state. For example, whether the mobile terminal has currently turned on the light sensing and the color temperature detection is determined. If the mobile terminal has currently turned on the light sensing and the color temperature detection, the light sensing, and the color temperature detection are controlled to be turned off. On the other hand, if the mobile terminal has turned off the light sensing and the color temperature detection, the light sensing and the color temperature detection will remain in the turn-off state.

At block 203, compare the unlocking password entered and a preset password, and a display screen of the mobile terminal will be unlocked and lit up at least after the unlocking password entered and the preset password is matched. The display screen of the mobile terminal is lit up by invoking light sensation data and color temperature data used the last time the display screen of the mobile terminal was lit up. Obviously, the terminal cannot be unlocked if the comparison fails. It is possible to remind the user that he or she has failed to unlock the terminal or without any processing, and the implementations of the disclosure are not limited.

A moment that the display screen is lit up may be considered as a moment that the unlocking is finished.

To obtain better display effects, light sensing and color temperature detection will usually be turned on simultaneously. The method in accordance with the implementations of the disclosure is still applicable to scenes where only one of the light sensing and the color temperature detection is turned on. In this situation, what need to do is, determining whether only one of the light sensing and the color temperature detection is turned on and if so, turning it off and then lighting up the display screen by invoking data used the last time the display screen was lit up. "The last time" used herein may refer to that, with respect to the current screen-off state, when the display screen was lit up in the previous time. In addition to the data used the last time the display screen was lit up, data used for lighting up set by manufactures or the user may also be invoked to light up the display screen, and the implementations of the disclosure are not limited thereto.

At block 204, the light sensing and the color temperature detection are turned on.

At block 205, a brightness value and a color temperature value of the display screen lit up at block 203 are adjusted according to light sensation data and color temperature data currently detected.

In the implementation, as data for unlocking and lighting up the display screen last time is used to unlock and light up the display screen, the data may not fit current environment. So, the light sensing and the color temperature detection are re-turned on after lighting up the display screen, to auto-adjust brightness and color temperature of the display screen according to the current environment, thereby meeting real-time requirements of the user, further ensuring display effects of the screen while improving the unlocking speed.

Third Implementation

Figure 3:
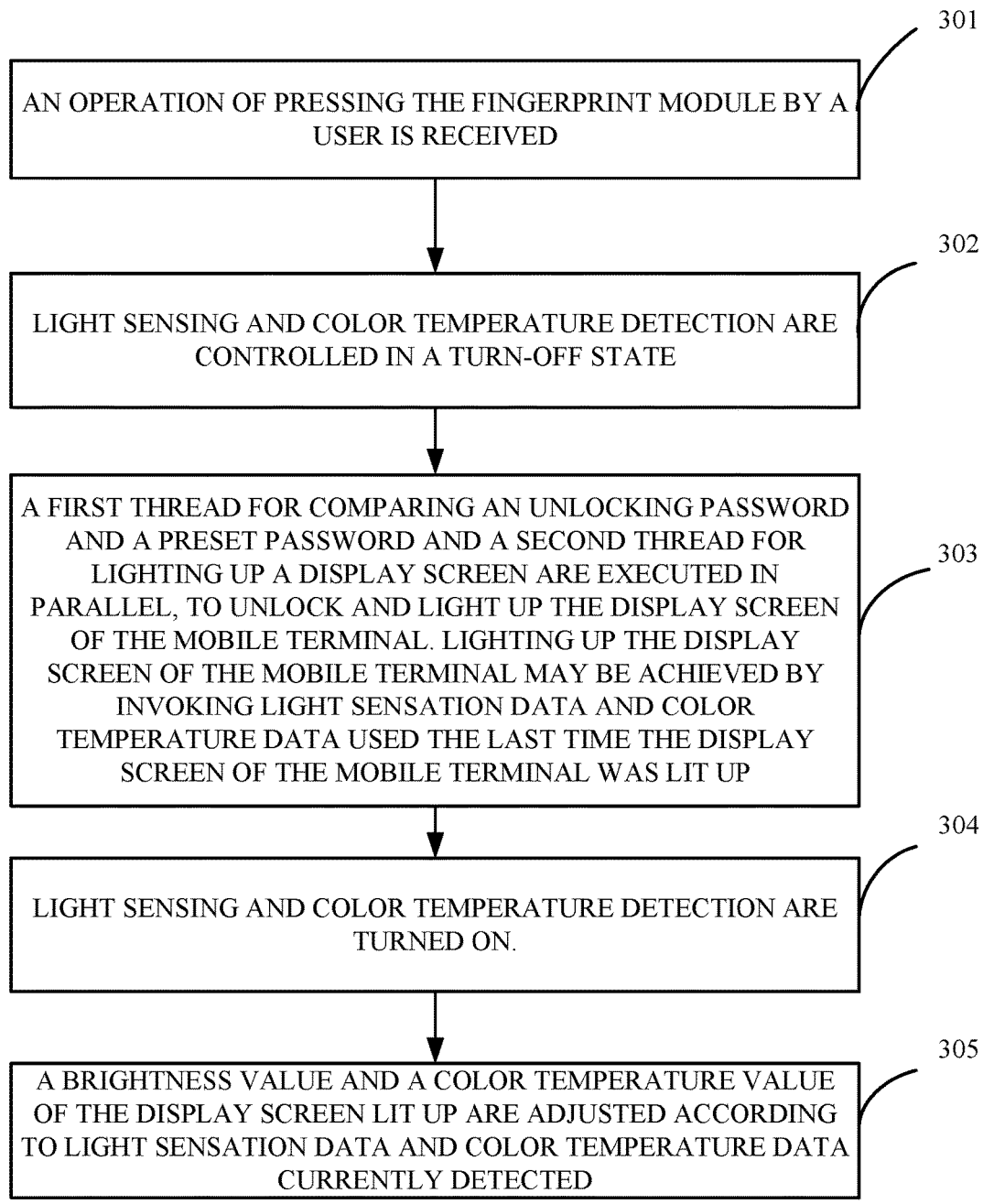
FIG. 3 is a schematic flowchart illustrating a method for improving unlocking speed in accordance with a third implementation of the disclosure.

FIG. 3 is a schematic flow chart illustrating a method for improving unlocking speed in accordance with a third implementation of the disclosure. The method is applicable to a mobile terminal performing fingerprint unlocking in a screen-off state. The mobile terminal includes a fingerprint module. The method may include the following.

At block 301, an operation of pressing the fingerprint module by a user is received.

The operation of pressing the fingerprint module by the user may be divided into two stages, that is, a first stage and a second stage. At the first stage, the user touches the fingerprint module, and at the second stage, an intensity value of pressing reaches a preset intensity value. The capacitance of a capacitor for generating an IRQ in the fingerprint module may be changed at the moment that the user touches the fingerprint module. The mobile terminal may treat the moment as a start time of unlocking and perform a fingerprint unlocking operation.

At block 302, light sensing and color temperature detection are controlled in a turn-off state. For example, whether the mobile terminal has turned on the light sensing and the color temperature detection is determined. If the mobile terminal has turned on the light sensing and the color temperature detection, the light sensing, and the color temperature detection are controlled to be turned off. And if the mobile terminal has turned off the light sensing and the color temperature detection, these two functions will remain in the turn-off state.

At block 303, a first thread for comparing an unlocking password and a preset password and a second thread for lighting up a display screen are executed in parallel, to unlock and light up the display screen of the mobile terminal. Lighting up the display screen of the mobile terminal may be achieved by invoking light sensation data and color temperature data used the last time the display screen of the mobile terminal was lit up.

As can be seen, in this implementation, the light sensing and color temperature detection are turned off at block 302, thereby eliminating the need for tedious and time-consuming detection of brightness and color temperature of current real-time environment, which can improve the running speed of a processor of the mobile terminal and consequently can improve the unlocking speed. Besides, the first thread and the second thread are executed in parallel at block 303, the throughput of the processor can be improved and the unlocking time can be further shortened.

The method for improving the unlocking speed in accordance with the third implementation may further include the following.

At block 304, the light sensing and the color temperature detection are turned on.

At block 305, a brightness value and a color temperature value of the display screen lit up are adjusted according to light sensation data and color temperature data currently detected.

In the implementation, the display screen of the mobile terminal is lit up by invoking the light sensation data and the color temperature data used the last time the display screen of the mobile terminal was lit up. Thereby eliminating the need for tedious and time-consuming detection of brightness and color temperature of the current real-time environment, so that the screen can be lit up immediately and the unlocking speed can be improved. Moreover, the first thread for comparing the unlocking password and the preset password and the second thread for lighting the screen are executed in parallel, compared with the related art in which unlocking is performed prior to lighting up the display screen, the unlocking time can be further reduced and the unlocking speed can be further improved.

Fourth Implementation

Figure 4:
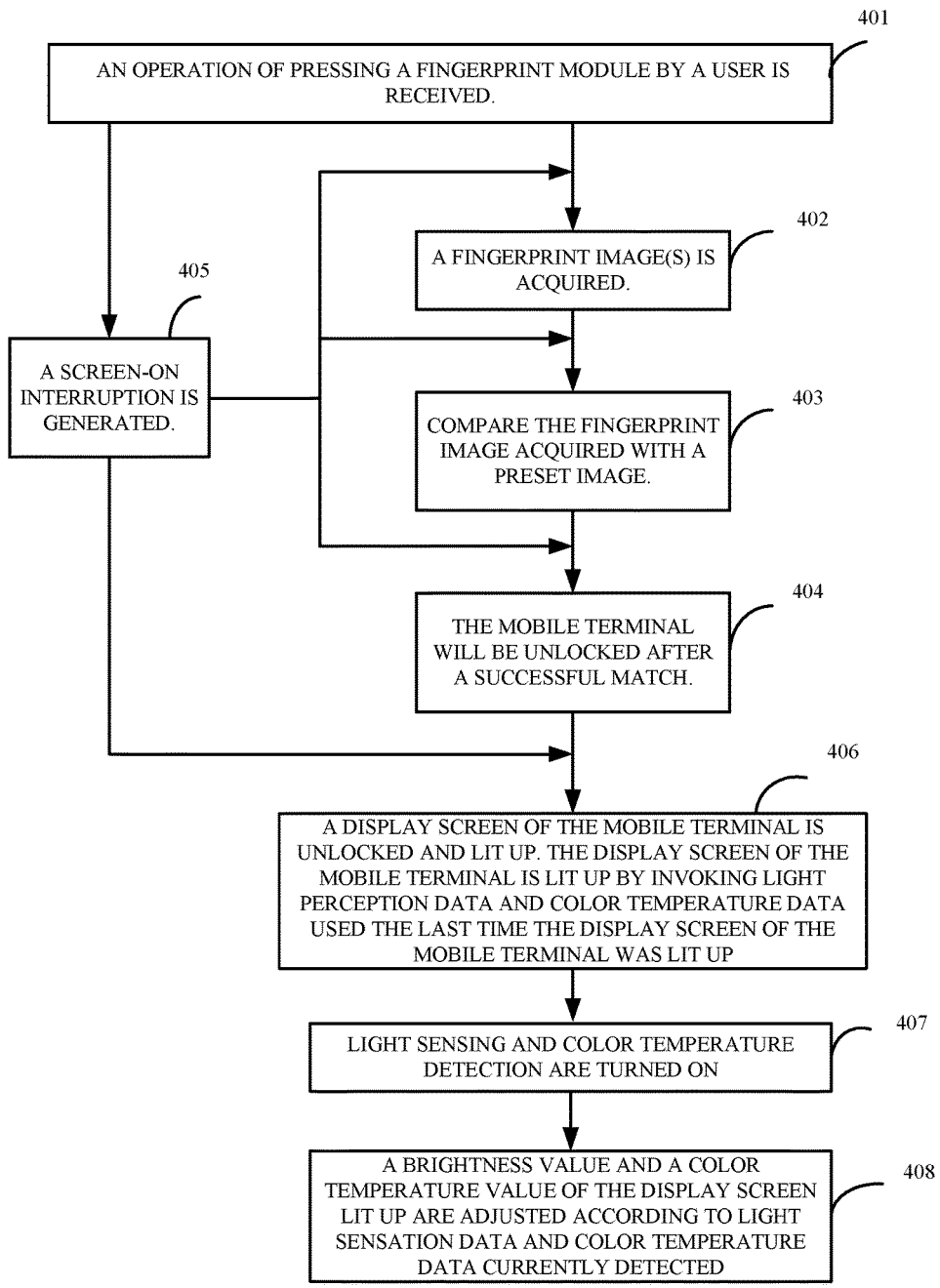
FIG. 4 is a schematic flowchart illustrating a method for improving unlocking speed in accordance with a fourth implementation of the disclosure.

FIG. 4 is a schematic flowchart illustrating a method for improving unlocking speed in accordance with a fourth implementation of the disclosure. The method is applicable to a mobile terminal performing fingerprint unlocking in a screen-off state. The mobile terminal includes a fingerprint module. The method may include the following.

At block 401, an operation of pressing the fingerprint module by a user is received.

The operation of pressing the fingerprint module by the user may be divided into two stages including a first stage and a second stage. At the first stage, the user touches the fingerprint module; at the second stage, an intensity value of pressing reaches a preset intensity value. The capacitance of a capacitor for generating an IRQ in the fingerprint module may be changed at the moment that the user touches the fingerprint module, so that the mobile terminal may consider the moment as a start time of unlocking and perform a fingerprint unlocking operation. An operation of lighting up the screen is triggered when the intensity value reaches the preset intensity value. Operations at block 402 will be performed when the fingerprint module is touched, and operations at block 405 will be performed when the intensity value of finger pressing reaches the preset intensity value. Operations at block 402 to block 404 can be understood as the first thread, and operations at block 405 can be understood as the second thread.

At block 402, a fingerprint image(s) is acquired.

At block 403, compare the fingerprint image acquired with a preset image.

At block 404, the mobile terminal will be unlocked after a successful match. Obviously, the terminal cannot be unlocked if the comparison fails. It is possible to remind the user that the user has failed to unlock the terminal or the mobile terminal will do nothing, and the implementations of the disclosure are not limited.

If the fingerprint module of the mobile terminal is equipped with a metal dome array and the current unlock mode is press-to-unlock in a screen-off state, S405 may be executed in parallel with the execution of S401 to S403.

At block 405, a screen-on interruption is generated when the intensity value of pressing reaches the preset intensity value.

At block 406, a display screen of the mobile terminal is unlocked and lit up, after the successful match and the screen-on interruption is generated. The display screen of the mobile terminal is lit up by invoking light sensation data and color temperature data used the last time the display screen of the mobile terminal was lit up.

In one implementation, the terminal is unlocked when the fingerprint image acquired is matched, and the display screen is lit up when the screen-on interruption is generated. The display screen is unlocked and lit up when the fingerprint image acquired is matched and the screen-on interruption is generated. That is, if the fingerprint image acquired is successfully matched before the screen-on interruption is generated, the display screen will be unlocked first, and then the display screen will be lit up when the screen-on interruption is generated; otherwise, if the screen-on interruption is generated before the fingerprint image acquired is matched, the display screen will be lit up first and then a locked interface will be displayed. The mobile terminal then switches to an unlock interface after the fingerprint image acquired is matched, to complete the unlocking and lighting up of the display screen. In another implementation, after the screen-on interruption is generated, the display screen will not be lit up until the fingerprint image acquired is matched. That is, the display screen is lit up after the mobile terminal is unlocked. Therefore, a moment that the display screen is lit up can be considered as a completion of the unlocking.

According to the speed of pressing the fingerprint module by the user, block 405 may be performed between block 401 and block 402, or between block 402 and block 403, or between block 403 and block 404, or subsequent to block 404.

The fingerprint module may include a metal dome array. The metal dome array having a metal dome (also known as "snap dome") located on a conductive portion of a print circuit board (PCB). When the intensity value of pressing reaches the preset intensity value, a center point of the metal dome concaves and touches a line of the PCB, thereby forming a loop to make a current pass through, so that the entire product may function properly. The metal dome, generally made of stainless steel, is an important part of a switch. Due to its continuity, the metal dome can act as a switch between an operator and the product. Due to its stable rebound (automatic restored after pressing) and long service life, the metal dome can provide the operator with a better sense of touch feedback. The metal dome is mainly used in membrane switches of PCB and other hard boards. The metal dome array may be disposed under a fingerprint acquiring area of the fingerprint module. The first thread may be triggered when the user touches the fingerprint acquiring area; and the second thread may be triggered when the intensity of pressing applied to the metal dome array via the fingerprint acquiring area of the fingerprint module reaches the preset intensity value.

In the implementation, a common single thread of press-to-unlock is divided into two parallel threads, that is, Thread 1 and Thread 2. The single thread includes: press-to-trigger, finger-touch, fingerprint acquisition, fingerprint comparing, unlocking and lighting up. Thread 1 includes: finger-touch, fingerprint acquisition, fingerprint comparing, unlocking. Thread 2 includes: press-to-trigger, waiting to be unlocked, light-up. As the two threads may be performed in parallel, the operation of press-to-trigger in Thread 2 may be performed in Thread 1. The ideal situation is that press-to-trigger is subsequent to the completion of unlocking. For the user's sensation, pressing is the start time of unlocking, and time required for unlocking can be considered as a duration from pressing by the user to lighting up the display screen.

However, unlocking and lighting up would be performed only after two parallel threads are both completed. That is, the display screen would be unlocked and lit up only after the fingerprint image acquired is matched and the screen-on interruption is generated, if one of them is completed first, unlocking and lighting up would not be performed until the other one is completed. If press-to-trigger is subsequent to completing the unlocking, i.e., the intensity value of pressing of the user reaches the preset intensity value after completing the unlocking, there is no need to wait for comparing and unlocking. The unlocking time sensed by the user is the shortest, that is, from triggering interruption by pressing the metal dome array to light up the display screen, and usually only 60 ms to 100 ms, while common unlocking generally takes about 3 s. In the parallel manner, the metal dome array is pressed to reach the preset intensity value immediately when the user touches the fingerprint module, the fingerprint acquisition and fingerprint matching time will also be calculated for the unlocking time, and in this case, the unlocking time is the longest ("longest unlocking time" in the following). The longest unlocking time in two parallel threads in implementations of the present disclosure is still shorter than that in the single thread where operations such as finger-touch detection are subsequent to press-to-trigger. Therefore, the parallel threads in the implementations allow for a shorter time for triggering the fingerprint unlocking by pressing in the screen-off state and improved user experience.

The method for improving the unlocking speed in accordance with a forth implementation may further include the following.

At block 407, the light sensing and the color temperature detection are turned on.

At block 408, a brightness value and a color temperature value of the display screen lit up are adjusted according to light sensation data and color temperature data currently detected.

Prior to any of block 402 to block 405, light sensing and color temperature detection are controlled in a turn-off state. Specifically, whether the mobile terminal has turned on the light sensing and the color temperature detection is determined; if so, the light sensing and the color temperature detection are controlled to be turned off. Otherwise, if the mobile terminal has turned off the light sensing and the color temperature detection, these two functions will remain in the turn-off state.

To obtain better display effects, light sensing and color temperature detection will usually be turned on simultaneously. The method in accordance with the implementations of the disclosure is still applicable to scenes where only one of the light sensing and the color temperature detection is turned on. In this situation, what need to do is, determining whether only one of the light sensing and the color temperature detection is turned on and if so, turning it off and then lighting up the display screen by invoking data used the last time the display screen was lit up. "The last time" referred to herein may refer to with respect to the current screen-off state, when the display screen was lit up in the previous time. In addition to the data used the last time the display screen was lit up, data used for lighting up set by manufactures or the user may also be invoked to light up the display screen, and the implementations of the disclosure are not limited thereto.

In the implementation, the unlocking time can be greatly shortened by using the parallel threads and can be further shortened as there is no need to perform the light sensing and the color temperature detection when lighting up the display screen. The light sensing and the color temperature detection are re-turned on after lighting up the display screen, to auto-adjust brightness and color temperature of the display screen according to the current environment, thereby meeting real-time requirements of the user, further ensuring display effects of the screen while improving the unlocking speed.

Fifth Implementation

Figure 5:
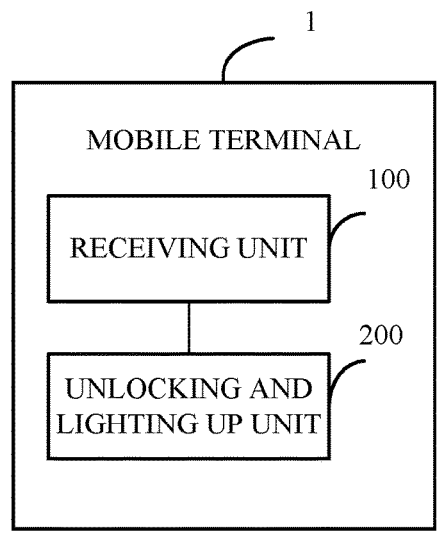
FIG. 5 is a schematic diagram of functional modules of a mobile terminal in accordance with a fifth implementation of the disclosure.

FIG. 5 is a schematic diagram of functional modules of a mobile terminal 1 in accordance with an implementation of the disclosure. In the implementation, the mobile terminal 1 may include a receiving unit 100 and an unlocking and lighting up unit 200.

The receiving unit 100 can be implemented as a receiver or a sensor coupled to or integrated in a fingerprint module for example. The receiving unit 100 can also be other hardware components. The unlocking and lighting up unit 200 can be a processor or a circuit or control component coupled to or integrated in the processor.

The receiving unit 100 is configured to receive from a user an operation of entering an unlocking password.

The following describes the fingerprint password as an example. The user may touch a fingerprint module with a finger when entering the unlocking password. The capacitance of a capacitor for generating an IRQ in the fingerprint module then may be changed. The mobile terminal may treat the moment of touching the fingerprint module as a start time of unlocking.

The operation of entering the unlocking password can be implemented as entering the biological password of the user for example. In this case, in response to the operation, the biological password will be obtained and compared with a preset biological password. For example, a fingerprint image, an iris image, a face image, a brain wave image, an electrocardiographic image, or a sound waveform image entered will be compared with a preset fingerprint image, a preset iris image, a preset face image, a preset brain wave image, a preset electrocardiographic image, or a preset sound waveform image correspondingly. For example, the mobile terminal may receive an operation of entering a fingerprint image by a fingerprint module, then acquire the fingerprint image entered by the user and compare it with the preset fingerprint image.

After obtaining the biological password, to better compare a preset password, an original image corresponding to the obtained biological password can be optimized to make the original image clearer.

The unlocking and lighting up unit 200 is configured to compare the unlocking password entered with the preset password, and to unlock and light up a display screen of the mobile terminal at least after a successful match. The display screen of the mobile terminal is lit up by invoking light sensation data and color temperature data used when the display screen of the mobile terminal was lit up last time.

Obviously, the terminal will not be unlocked if the comparison fails. It is possible to remind the user that he or she has failed to unlock the mobile terminal or do nothing, and the implementations of the disclosure are not limited.

In one implementation, the terminal is unlocked when the unlocking password entered is matched, and the display screen is lit up when the screen-on interruption is generated. The display screen is unlocked and lit up when the unlocking password entered is matched and the screen-on interruption is generated. That is, if the unlocking password entered is successfully matched before the screen-on interruption is generated, the display screen will be unlocked first, and then the display screen will be lit up when the screen-on interruption is generated; otherwise, if the screen-on interruption is generated before the unlocking password entered is successfully matched, the display screen will be lit up first and then a locked interface will be displayed. The mobile terminal then switches to an unlock interface after the unlocking password entered is matched, to complete the unlocking and lighting up of the display screen. In another implementation, after the screen-on interruption is generated, the display screen will not be lit up until the unlocking password entered is matched. That is, the display screen will be lit up after the mobile terminal is unlocked. Therefore, a moment that the display screen is lit up can be considered as a completion of the unlocking.

To obtain better display effects, light sensing and color temperature detection will usually be turned on simultaneously. The method in accordance with the implementations of the disclosure is still applicable in scenes where only one of the light sensing and the color temperature detection is turned on. In this situation, what need to do is, determining whether only one of the light sensation and the color temperature detection is turned on and if so, turning it off and then lighting up the display screen by invoking data used the last time the display screen was lit up. "The last time" used herein may refer to that, with respect to the current screen-off state, when the display screen was lit up in the previous time. In addition to the data used the last time the display screen was lit up, data used for lighting upset by manufactures or the user may also be invoked to light up the display screen, and the implementations of the disclosure are not limited thereto.

In the screen-off state, the receiving unit 100 can receive the operation of entering the unlocking password by the user, and obtain the unlocking password entered by the user. Then the unlocking and lighting up unit 200 compares the unlocking password and the preset password. If the unlocking password and the preset password are matched, the unlocking and lighting up unit 200 performs unlocking. After unlocking, the light sensing and the color temperature detection will be turned off or remain in a turn-off state, and the display screen of the mobile terminal then will be lit up by invoking the light sensation data and the color temperature data used when the display screen of the mobile terminal was lit up last time. Thereby eliminating the need for tedious and time-consuming detection of brightness and color temperature of the current real-time environment and consequently, the display screen can be lit up immediately, and the unlocking speed can be improved. The user does not have to wait for an excessively long unlocking time, thereby improving practicability of the terminal and providing better user experience for the user.

Sixth Implementation

Figure 6:
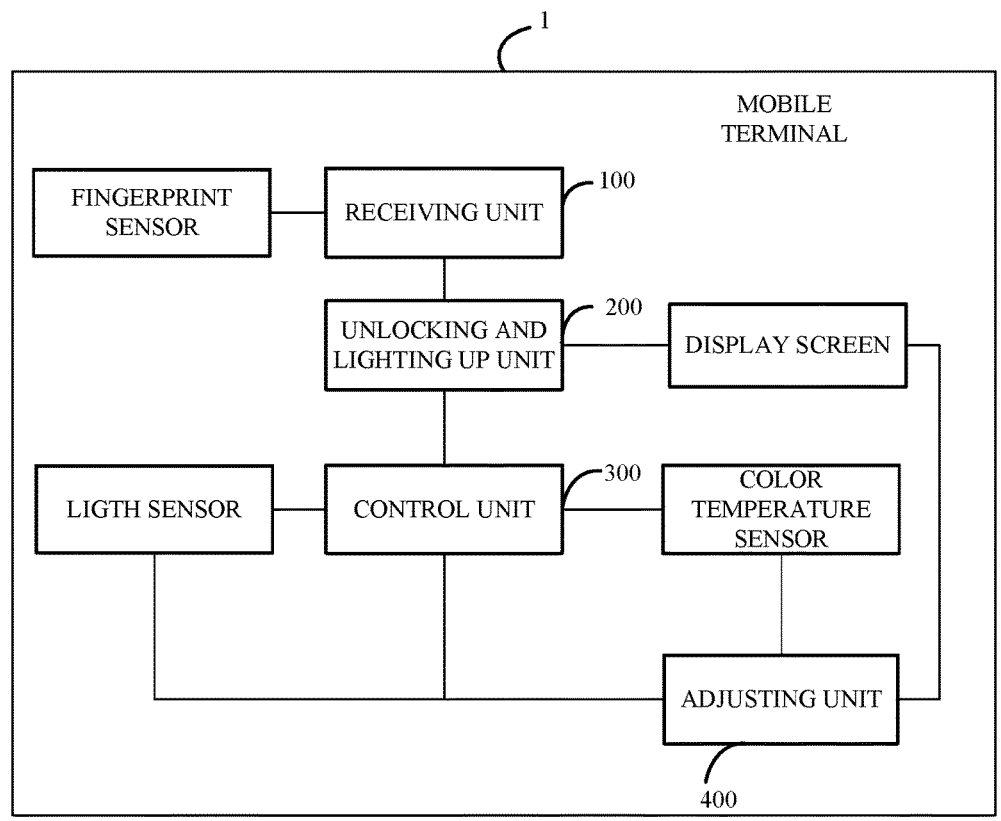
FIG. 6 is a schematic diagram of a functional module of a mobile terminal in accordance with a sixth implementation of the disclosure.

FIG. 6 is a schematic block diagram of functional modules of the mobile terminal 1 in accordance with an implementation of the disclosure. In the implementation, the mobile terminal 1 may include the receiving unit 100, the unlocking and lighting up unit 200, a control unit 300, and an adjusting unit 400. The control unit 300 and the adjusting unit 400 can be disposed integrally or separately.

The receiving unit 100 is configured to receive from a user an operation of entering an unlocking password. The receiving unit 100 can be coupled to a fingerprint sensor and receive the operation of the user via the fingerprint sensor. For example, when the user places his or her finger above the fingerprint sensor, unlocking password (such as fingerprint images) can be received.

The unlocking password may be a biological password. The biological password may include but is not limited to a fingerprint password, an iris password, a face identification password, a brain wave password, or a heartbeat password.

The following describes the fingerprint password as an example. The user may touch a fingerprint module with a finger when entering the unlocking password. The capacitance of a capacitor for generating an IRQ in the fingerprint module then may be changed. The mobile terminal may treat the moment of touching the fingerprint module as a start time of unlocking.

When the unlocking password entered is the biological password, in response to the entering of the biological password, the biological password will be obtained and compared with a preset biological password. For example, a fingerprint image, an iris image, a face image, a brain wave image, an electrocardiographic image, or a sound waveform image entered will be compared with a preset fingerprint image, a preset iris image, a preset face image, a preset brain wave image, a preset electrocardiographic image, or a preset sound waveform image is correspondingly compared. For example, the mobile may receive an operation of entering a fingerprint image by touching a fingerprint module, then acquire the fingerprint image entered by the user and compare it with the preset fingerprint image.

After obtaining the biological password, to better compare a preset password, an original image corresponding to the obtained biological password can be optimized to make the original image clearer.

The unlocking and lighting up unit 200 is configured to compare the unlocking password entered and the preset password, and to unlock and light up a display screen of the mobile terminal at least after a successful match. In one implementation, the display screen of the mobile terminal can be lit up by invoking light sensation data and color temperature data used the last time the display screen of the mobile terminal was lit up.

The control unit 300 is configured to control the state of light sensing and color temperature detection. The light sensing and the color temperature detection can be achieved via a light sensor and a color temperature sensor respectively. The control unit can be coupled with the light sensor and the color temperature sensor. For example, the control unit 300 may be configured to turn on light sensing and color temperature detection to detect light sensation data and color temperature data, after the unlocking and lighting up unit 200 unlocks and lights up the display screen of the mobile terminal. The adjusting unit 400 can be configured to adjust a brightness value and a color temperature value of the display screen lit up according to the light sensation data and the color temperature data, currently detected by the light sensor and the color temperature sensor for example. As illustrated in FIG. 6, the adjusting unit 400 can be coupled to the display screen.

The control unit 300 may also be configured to control to turn off the light sensing and color temperature detection, or maintain the light sensing and the color temperature detection in a turn-off state, before the unlocking and lighting up unit 200 lights up the display screen of the mobile terminal.

As data for unlocking and lighting up the display screen last time is used to unlock and light up the display screen, the data may not fit current environment. So, the light sensing and the color temperature detection are re-turned on after lighting up the display screen, to auto-adjust brightness and color temperature of the display screen according to the current environment, thereby meeting real-time requirements of the user, further ensuring display effects of the screen while improving the unlocking speed.

In the mobile terminal 1 of the first implementation as illustrated in FIG. 5 and t second implementation as illustrated in FIG. 6, the mobile terminal 1 may further include a fingerprint module. The unlocking password may be a fingerprint password for example. The receiving unit 100 is configured to receive from the user an operation of pressing the fingerprint module.

The unlocking and lighting up unit 200 configured to compare the unlocking password entered and the preset password and to unlock and light up the display screen of the mobile terminal at least after the unlocking password entered and the preset password is matched, can be further configured to perform in parallel a first thread for comparing the unlocking password and the preset password and a second thread for lighting up the screen, so as to unlock and light up the display screen of the mobile terminal.

In terms of performing in parallel the first thread and the second thread to unlock and light up the display screen of the mobile terminal, the unlocking and lighting up unit 200 can be further configured to perform the first thread when the fingerprint module is touched, perform the second thread when an intensity value of pressing reaches a preset intensity value, and then unlock and light up the display screen when the fingerprint image acquired is matched and the screen-on interruption is generated. During the first thread, the fingerprint image can be acquired and compared with a preset image, and the display screen can be unlocked after the fingerprint image acquired is matched. During the second thread, the screen-on interruption can be generated.

The second thread may be performed after the first thread has started and prior to acquiring the fingerprint image, or subsequent to acquiring the fingerprint image and prior to matching, or subsequent to comparing and prior to matching successfully, or subsequent to matching successfully and prior to lighting up the display screen.

If the mobile terminal is provided with a metal dome array and the current unlock mode is press-to-unlock in a screen-off state, execute the first thread and execute the second thread during the execution of the first thread. During the execution of the first thread, the receiving unit 100 receives from the user the operation of touching the fingerprint module, and obtains the fingerprint image in response to the operation of entering the unlocking password; the unlocking and lighting up unit 200 compares the fingerprint image acquired with the preset fingerprint image and unlocks the display screen after the fingerprint image acquired is matched. During the execution the second thread, the receiving unit 100 obtains an intensity value generated by pressing the metal dome array, in response to the operation of entering the unlocking password; the unlocking and lighting up unit 200 generates the screen-on interruption after the intensity value reaches the pre-set value. The unlocking and lighting up unit 200 will unlock and light up the display screen when the unlocking is completed and the screen-on interruption is generated.

As can be seen, a common single thread of press-to-unlock is divided into two parallel threads, that is, Thread 1 and Thread 2. The common single thread includes: press-to-trigger, finger-touch, fingerprint acquisition, fingerprint comparing, unlocking and lighting up. Thread 1 includes: finger-touch, fingerprint acquisition, fingerprint comparing, and unlocking. Thread 2 includes: press-to-trigger, waiting to be unlocked, and lighting up. As the two threads may be performed in parallel, the operation of press-to-trigger in Thread 2 may be performed in Thread 1. The ideal situation is that press-to-trigger is subsequent to the completion of unlocking. So, the unlocking time in the ideal situation can be considered as the duration from pressing by the user to lighting up the display screen. If press-to-trigger is subsequent to completing the unlocking, the time for unlocking is the shortest, that is, from triggering interruption by pressing the metal dome array to light up the display screen, and usually 60 ms to 100 ms, while common unlocking takes about 3 s. In the parallel manner, the metal dome array is pressed to reach the preset intensity value immediately when the user touches the fingerprint module, the fingerprint acquisition and the fingerprint matching time will also be calculated for the unlocking time, and in this case, the unlocking time is the longest. However, the longest unlocking time in two parallel threads in implementations of the present disclosure is still shorter than that in the single thread where operations such as finger-touch detection are subsequent to press-to-trigger. Therefore, the parallel threads in the implementations allow for a shorter time for triggering the fingerprint unlocking by pressing in the screen-off state can be greatly shortened and improved user experience.

The above-described receiving unit 100, unlocking and lighting up unit 200, control unit 300, and adjusting unit 400 may be set separately or integrated. The receiving unit 100, unlocking and lighting up unit 200, control unit 300, and adjusting unit 400 may be set as a hardware (such as a microprocessor) separately from a processor of the mobile terminal. They may be embedded in the processor of the mobile terminal in the form of hardware. Alternatively, they may also be stored in a memory of the mobile terminal in the form of software, so as to be invoked by the processor of the mobile terminal to complete the operations of the receiving unit 100, unlocking and lighting up unit 200, control unit 300, and adjusting unit 400.

For example, in the mobile terminal, the sixth implementation of the disclosure, the unlocking and lighting up unit 200 may be a microprocessor of the mobile terminal. The receiving unit 100 and the adjusting unit 400 may be embedded in the processor, or separately from the processor, or stored in the memory in the form of software to be invoked by the processor to achieve functions of the receiving unit 100 and the adjusting unit 400. The control unit can be a controller or micro-controller. Implementations of the disclosure are not limited thereto. "Processor" can be a central processing unit (CPU), a microprocessor, a micro-controller, or the like.

Seventh Implementation

Figure 7:
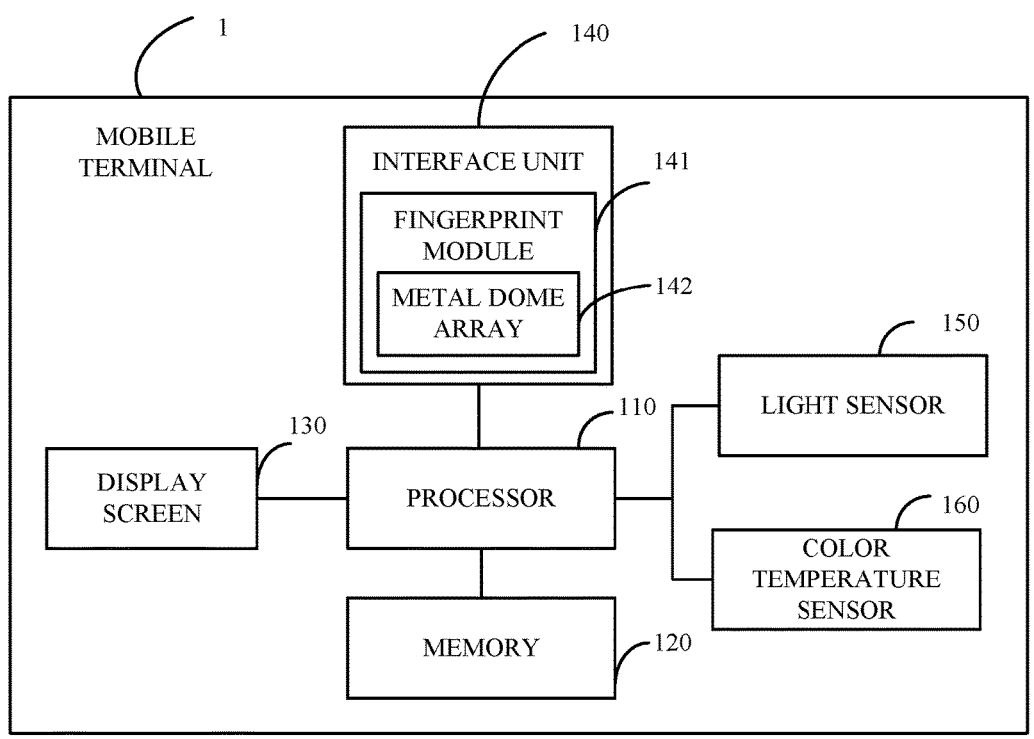
FIG. 7 is a hardware architecture diagram of a mobile terminal in accordance with a seventh implementation of the disclosure.

FIG. 7 is a hardware architecture diagram of the mobile terminal 1 in accordance with an implementation of the disclosure. In the implementation, the mobile terminal 1 may include a processor 110, a memory 120, a display screen 130, and an interface unit 140. The interface unit 140 is configured to receive from a user an operation of entering an unlocking password.

The processor 110 is connected to the memory 120, the display screen 130, and the interface unit 140.

The memory 120 is configured to store a set of program codes. The processor 110 is configured to invoke the program codes stored in memory 120 to perform part or all of the steps of the method for improving the unlocking speed described in any of the above implementations.

For example, the processor 110 is configured to receive the operation of entering the unlocking password by the user via the receiving unit 100.

The processor 110 compares the unlocking password entered with a preset password, and the display screen 130 of the mobile terminal 1 will be unlocked and lit up at least after the unlocking password entered and the preset password is matched. In one implementation, the display screen 130 of the mobile terminal 1 is lit up by invoking light sensation data and color temperature data used the last time the display screen 130 of the mobile terminal 1 was lit up.

After the display screen 130 of the mobile terminal 1 is unlocked and lit up, the processor 110 is further configured to turn on light sensing and color temperature detection, and adjust a brightness value and a color temperature value of display screen 130 that is lit up according to light sensation data and color temperature data currently detected. The light sensing can be achieved via a light sensor 150. The color temperature detection can be achieved via a color temperature sensor or detector 160.

The unlocking password may be a biological password.

The biological password may include a fingerprint password, an iris password, a face identification password, a brain wave password, or a heartbeat password.

As illustrated in FIG. 7, the interface unit 140 may include a fingerprint module 141 (such as a fingerprint sensor). As one implementation, the fingerprint module 141 is equipped with a metal dome array 142, and the current unlock mode is press-to-unlock in a screen-off state, the processor 110 is further configured to perform a first thread and perform a second thread during the execution of the first thread. During the first thread, an operation of touching fingerprint module 141 by the user is received; a fingerprint image is acquired and compared with a preset fingerprint image; the display screen will be unlocked after the fingerprint image acquired is matched. During the second thread, the terminal waits for completion of the unlocking, and then lights up the display screen when an intensity value of pressing fingerprint module 141 reaches a preset value.

The receiving unit 100, the unlocking and lighting up unit 200, the control unit 300, and the adjusting unit 400 described above may be centralized program codes. The processor 110 can perform the method for improving the unlocking speed in any of the preceding implementations via the receiving unit 100, the unlocking and lighting up unit 200, the control unit 300, and the adjusting unit 400.

Implementations of the disclosure also provide a computer storage medium which can store programs. For example, the computer storage medium can store the receiving unit 100, the unlocking and lighting up unit 200, the control unit 300, and the adjusting unit 400 that are in the form of program instructions. The programs, when executed, can be configured to implement part or all of the steps of the methods described in the above implementations.

According to implementations of the present disclosure, in the screen-off state, by receiving the operation instruction of entering the unlocking password by the user, the unlocking password entered by the user can be obtained. Then compare the unlocking password and the preset password. If the unlocking password and the preset password are matched, unlocking is performed. After unlocking, whether the mobile terminal has turned on light sensing and color temperature detection is determined. Based on a determination that the mobile terminal has turned on light sensing and color temperature detection, the light sensing and the color temperature detection will be turned off and the light sensation data and the color temperature data used the last time the display screen of the mobile terminal was lit up will be invoked to light up the display screen of the mobile terminal.

At least one of the following advantageous effects can be achieved by means of the technical schemes of the present disclosure. For example, the need of tedious and time-consuming detection of brightness and color temperature of current real-time environment can be eliminated and as a result, the screen can be lit up immediately and the unlocking speed can be improved. The user does not have to wait for an excessively long unlocking time, thereby improving practicability of the terminal and providing better user experience for the user.

Continuing, after lighting up the display screen, the light sensing and the color temperature detection are re-turned on, to auto-adjust brightness and color temperature of the display screen according to the current environment, thereby meeting real-time requirements of the user, further ensuring display effects of the screen while improving the unlocking speed. Since one common single thread of press-to-unlock is replaced by two parallel threads, i.e., two threads performed in parallel, unlocking time for press-to-unlock in the screen-off state can be shortened and user experience can be improved.

It should be noted that implementations in the present specification are described in a progressive manner, each implementation may focus on differences from other implementations; for the same or similar parts in the implementations, and reference can be made to each other. The device implementations are substantially similar to the method implementations and therefore, the description of the device is relatively simple. For the relevant part, reference can be made to part of the description of the method implementations.

In the implementations provided herein, the disclosed device may be implemented in other ways. For example, the device implementations described above are merely illustrative, for example, the division of the units is only a logical function division and there may be other division manners in actual implementation. For example, multiple units or components may be combined or integrated into another system, or some features can be omitted or not executed. In addition, coupling, direct coupling, or communication connection illustrated or discussed may be indirect coupling or communication connection through some interfaces, devices or units, and may be electrical or other forms.

The units described as separated components may or may not be physically separate, and the components illustrated as units may or may not be physical units, i.e., may be located in one place or may be distributed over a plurality of network elements. Part or all of the units may be selected according to actual needs to achieve the object of the implementations.

In addition, the functional units in the implementations of the present disclosure may be integrated in one processing unit, or each unit may exist physically alone, or two or more units may be integrated in one unit. The above-mentioned integrated units can be implemented in the form of hardware or software function units.

When the integrated units are implemented in the form of software function units and are sold or used as a separate product, the integrated units may be stored in a computer-readable storage medium. Based on such understanding, the technical solutions of the present disclosure may essentially, or part that contributes to the prior art, or all or part of the technical solutions may be embodied in the form of a software product stored in a storage medium, including a number of instructions for enabling a computer device (may be a personal computer, a server, or a network device, etc.) to perform all or part of the steps of the methods described in the implementations of the present disclosure. Memory 120 and the storage medium may include a magnetic disk, an optical disk, a read-only memory (ROM), a random access memory (RAM), or the like.

Eighth Implementation

Figure 8:
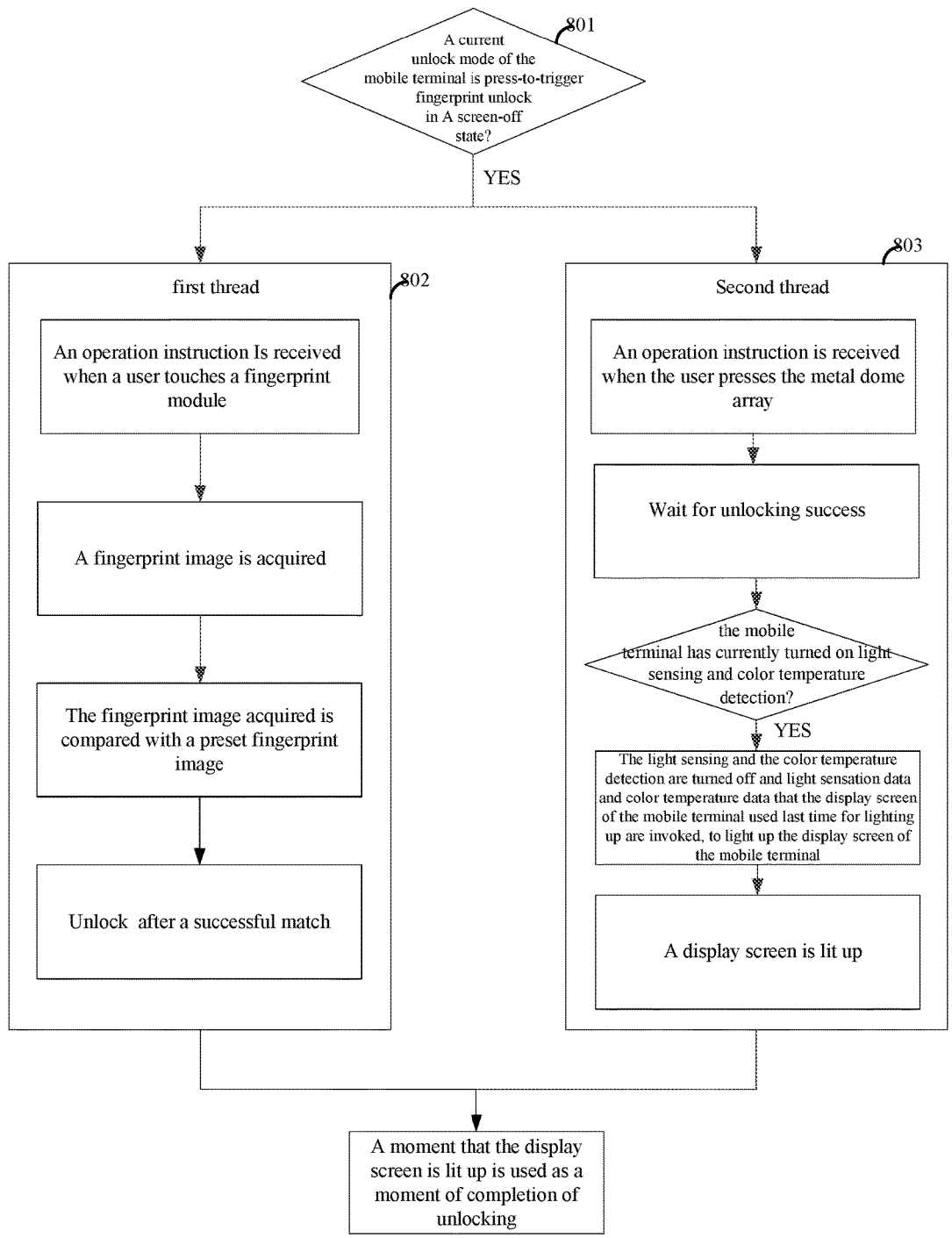
FIG. 8 is a schematic flowchart illustrating a method for improving unlocking speed in accordance with an eighth of the disclosure.

FIG. 8 is a schematic flowchart illustrating a method for improving unlocking speed in accordance with an eighth of the disclosure. As illustrated in FIG. 8, the method is applied to a mobile terminal in a screen-off state and equipped with a metal dome array and may include the following operations.

At block 801, whether a current unlock mode of the mobile terminal is press-to-trigger fingerprint unlock in the screen-off state is determined. When the current unlock mode of the mobile terminal is press-to-trigger fingerprint unlock in the screen-off state, advance to execute a first thread at block 802 and a second thread at block 803.

In one implementation, the first thread is executed when the current unlock mode of the mobile terminal is press-to-trigger fingerprint unlock in the screen-off state, and the second thread is executed during the execution of the first thread. The first thread includes the following. An operation instruction is received when a user touches a fingerprint module, a fingerprint image is acquired, the fingerprint image acquired is compared with a preset fingerprint image, and unlock after a successful match. The second thread includes the following. An operation instruction is received when the user presses the metal dome array, and wait for unlocking success and then a display screen is lit up.

In one implementation, prior to lighting up the display screen, the method further includes the following. Whether the mobile terminal has currently turned on light sensing and color temperature detection is determined. The light sensing and the color temperature detection are turned off and light sensation data and color temperature data used last time for lighting up the display screen of the mobile terminal are invoked, to light up the display screen of the mobile terminal, based on a determination that the mobile terminal has currently turned on the light sensing and the color temperature detection. A moment that the display screen is lit up is used as a moment of completion of unlocking.

In one implementation, the method further includes the following after the turning off the light sensing and the color temperature detection, and the invoking light sensation data and color temperature data used last time for lighting up the display screen of the mobile terminal to light up the display screen of the mobile terminal. The light sensing and the color temperature detection are turned on and a brightness value and a color temperature value of the display screen lit up are adjusted according to light sensation data and color temperature data currently detected.

As the first thread and the second thread are performed in parallel, the unlocking time can be greatly shortened and user experience can be improved.

Ninth Implementation

Figure 9:
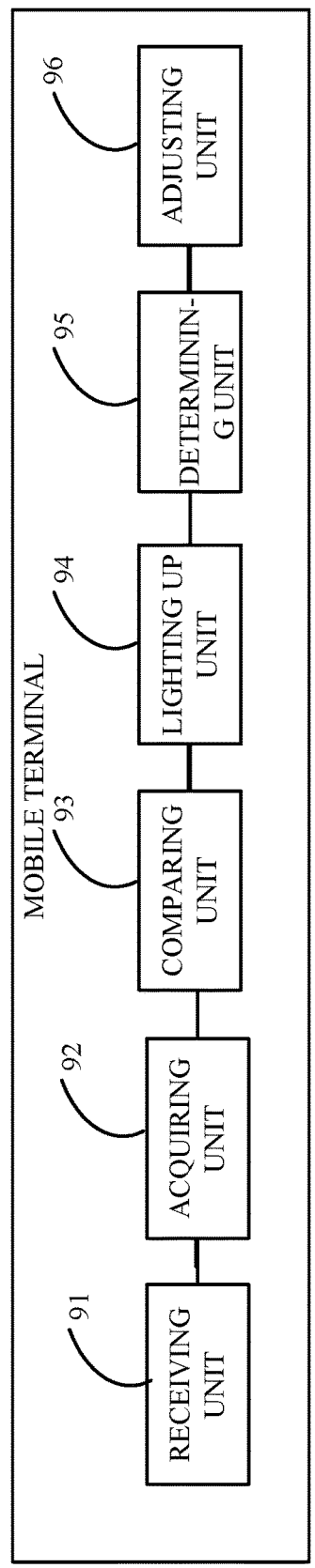
FIG. 9 is a schematic diagram of functional modules of a mobile terminal in accordance with a ninth implementation of the disclosure.

FIG. 9 is a schematic diagram of functional modules of a mobile terminal in accordance with a ninth implementation of the disclosure. As illustrated in FIG. 9, the mobile terminal includes a receiving unit 91, an acquiring unit 92, a comparing unit 93, a lighting up unit 94, and a determining unit 95. The above components can be a controller, microprocessor, or logical circuit. As one implementation, the above components can be integrated into a fingerprint sensor (also known as fingerprint identification sensor, fingerprint identification module, a fingerprint module and the like), or the receiving unit 91, the acquiring unit 92, and the comparing unit 93 can be integrated into a fingerprint module and the lighting up unit 94 and the determining unit 95 can be integrated into a controller or processor coupled with the fingerprint module.

In one implementation, a first thread is executed when a current unlock mode of the mobile terminal is press-to-trigger fingerprint unlock in the screen-off state, and a second thread is executed during the execution of the first thread. When the first thread is conducted, the receiving unit 91 is configured to receive an operation instruction when a user touches a fingerprint module, the acquiring unit 92 is configured to acquire a fingerprint image, and the comparing unit 93 is configured to compare the fingerprint image acquired with a preset fingerprint image and unlock after a successful match. When the second thread is conducted, the receiving unit 91 is further configured to receive an operation instruction when the user presses the metal dome array, and the lighting up unit 94 is configured to wait for unlocking success and then light up a display screen.

In one implementation, the determining unit 95 is configured to determine whether the mobile terminal has currently turned on light sensing and color temperature detection before the lighting up a display screen.

The lighting up unit 94 is further configured to turn off the light sensing and the color temperature detection and invoke light sensation data and color temperature data used last time for lighting up the display screen of the mobile terminal, to light up the display screen of the mobile terminal, based on a determination that the mobile terminal has currently turned on the light sensing and the color temperature detection.

In one implementation, a moment that the display screen is lit up is used as a moment of completion of unlocking.

In one implementation, the mobile terminal further includes an adjusting unit 96. The adjusting unit 96 is configured to: turn on the light sensing and the color temperature detection, after the lighting up unit turns off the light sensing and the color temperature detection and invokes light sensation data and color temperature data used last time for lighting up the display screen of the mobile terminal to light up the display screen of the mobile terminal; adjust a brightness value and a color temperature value of the display screen lit up according to light sensation data and color temperature data currently detected.

As described above, the above implementations are merely illustrative of the technical solutions of the present disclosure and are not intended to be limiting thereof. Although the present disclosure has been described in detail with reference to the foregoing implementations, those of ordinary skill in the art will understand that it is still possible to modify the technical solutions recited in the foregoing implementations or to equivalently replace some of the technical features therein, and that these modifications or substitutions do not depart from the scope of the technical solutions of the various implementations of the present disclosure.

What is claimed is:

1. A method for improving unlocking speed, applicable to a mobile terminal in a screen-off state and equipped with a metal dome array, comprising:
  executing a first thread when a current unlock mode of the mobile terminal is press-to-trigger fingerprint unlock in the screen-off state, and executing a second thread during the execution of the first thread; wherein the first thread comprises: receiving an operation instruction when a user touches a fingerprint module, acquiring a fingerprint image, comparing the fingerprint image acquired with a preset fingerprint image, and unlocking after a successful match; wherein the second thread comprises: receiving an operation instruction when the user presses the metal dome array, and waiting for unlocking success and then lighting up a display screen;
  prior to lighting up the display screen,
  determining whether the mobile terminal has currently turned on light sensing and color temperature detection;
  turning off the light sensing and the color temperature detection and invoking light sensation data and color temperature data used last time for lighting up the display screen of the mobile terminal, to light up the display screen of the mobile terminal, based on a determination that the mobile terminal has currently turned on the light sensing and the color temperature detection; and
  using a moment that the display screen is lit up as a moment of completion of unlocking.

2. The method of claim 1, wherein the method further comprises the following after the turning off the light sensing and the color temperature detection and the invoking light sensation data and color temperature data used last time for lighting up the display screen of the mobile terminal to light up the display screen of the mobile terminal:
  turning on the light sensing and the color temperature detection; and
  adjusting a brightness value and a color temperature value of the display screen lit up according to light sensation data and color temperature data currently detected.

3. A mobile terminal, being equipped with a metal dome array and comprising a processor connected to a memory configured to store a set of program codes, which when executed by the processor, become operational with the processor to:
  execute a first thread when a current unlock mode of the mobile terminal is press-to-trigger fingerprint unlock in a screen-off state, and execute a second thread during execution of the first thread;
  during the execution of the first thread, receive an operation instruction when a user touches a fingerprint module, acquire a fingerprint image, and compare the fingerprint image acquired with a preset fingerprint image and unlock after a successful match; during execution of the second thread, receive an operation instruction when the user presses the metal dome array, and wait for unlocking success and then light up a display screen;

determine whether the mobile terminal has currently turned on light sensing and color temperature detection before the lighting up a display screen; and turn off the light sensing and the color temperature detection and invoke light sensation data and color temperature data used last time for lighting up the display screen of the mobile terminal, to light up the display screen of the mobile terminal, based on a determination that the mobile terminal has currently turned on the light sensing and the color temperature detection;

a moment that the display screen is lit up being used as a moment of completion of unlocking.

4. The mobile terminal of claim 3, wherein the program codes, which when executed by the processor, further become operational with the processor to:

turn on the light sensing and the color temperature detection, after turning off the light sensing and the color temperature detection and invokes light sensation data and color temperature data used last time for lighting up the display screen of the mobile terminal to light up the display screen of the mobile terminal; and adjust a brightness value and a color temperature value of the display screen lit up according to light sensation data and color temperature data currently detected.

* * * * *